(12) United States Patent
Yamaguchi

(10) Patent No.: US 7,523,982 B2
(45) Date of Patent: Apr. 28, 2009

(54) SEALING STRUCTURE

(75) Inventor: Takayuki Yamaguchi, Tokyo (JP)

(73) Assignee: Moriroku Company, Ltd., Tokyo (JP)

( * ) Notice: Subject to any disclaimer, the term of this patent is extended or adjusted under 35 U.S.C. 154(b) by 0 days.

(21) Appl. No.: 11/852,402

(22) Filed: Sep. 10, 2007

(65) Prior Publication Data
US 2008/0073860 A1    Mar. 27, 2008

(30) Foreign Application Priority Data
Sep. 25, 2006    (JP) ............... 2006-258369

(51) Int. Cl.
*B60J 7/00*    (2006.01)
(52) U.S. Cl. .................................. 296/209
(58) Field of Classification Search ............... 296/209, 296/29, 203.03, 193.04, 204, 187.12; 277/355
See application file for complete search history.

(56) References Cited

U.S. PATENT DOCUMENTS

| 4,298,640 | A | * | 11/1981 | Katoh ......................... 428/31 |
| 4,607,878 | A | * | 8/1986 | Itoh ........................... 296/209 |
| 4,911,495 | A | * | 3/1990 | Haga et al. ................ 296/209 |
| 5,288,530 | A | * | 2/1994 | Maki ........................... 428/31 |
| 5,456,957 | A | * | 10/1995 | Jackson et al. ............... 428/31 |
| 6,030,030 | A | * | 2/2000 | Riddle et al. ............... 296/209 |
| 6,102,473 | A | * | 8/2000 | Steininger et al. .......... 296/209 |
| 6,171,543 | B1 | * | 1/2001 | Hirose ........................ 264/572 |
| 7,040,682 | B2 | * | 5/2006 | Tokumoto et al. .......... 296/209 |
| 7,168,757 | B2 | * | 1/2007 | Futatsuhashi ................ 296/209 |
| 2006/0066139 | A1 | * | 3/2006 | Futatshuashi ............... 296/209 |
| 2007/0006534 | A1 | * | 1/2007 | Hiramatsu et al. ........... 49/414 |

FOREIGN PATENT DOCUMENTS

JP    2006-044292    2/2006

* cited by examiner

*Primary Examiner*—Kiran B. Patel
(74) *Attorney, Agent, or Firm*—Leydig, Voit & Mayer, Ltd.

(57) ABSTRACT

A sealing structure for sealing a gap between a side sill of a vehicle body and a side sill garnish includes a generally tabular lip portion, a connecting portion branching from an intermediate region of a backside of the lip portion, and a fixing portion connecting with a lower end of the connecting portion and extending along the back side of a top end portion of a side sill garnish. The side sill garnish has an upper wall, a lower wall, and a channel on an end face of a top end portion. The upper wall, the lower wall, and the channel extend in the longitudinal direction of the side sill garnish. The lip portion is inserted into the channel and the fixing portion is adhered to the back side of the top end portion by double-sided adhesive tape.

14 Claims, 7 Drawing Sheets

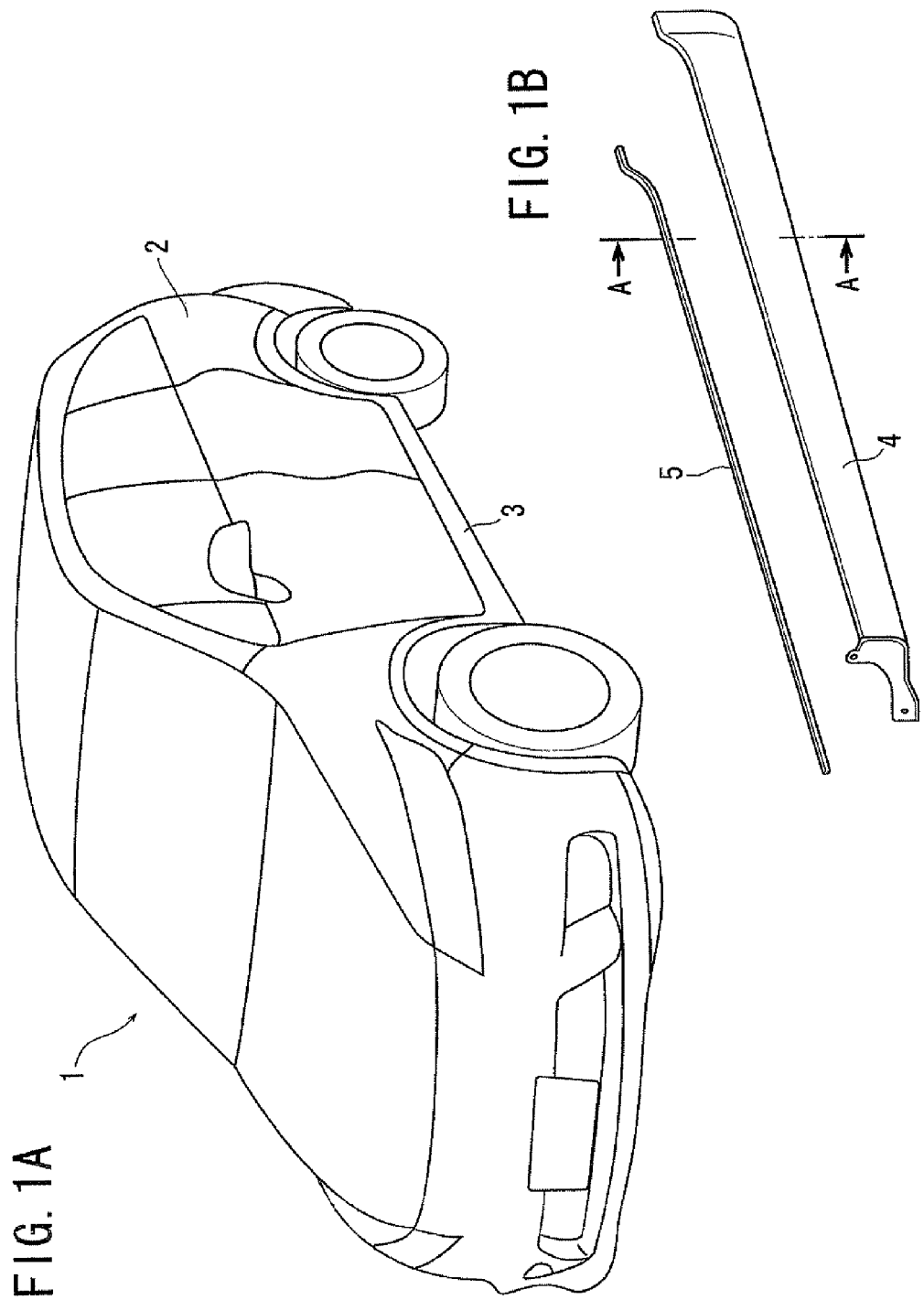

SEALING STRUCTURE

FIELD OF THE INVENTION

The present invention relates to a sealing structure for sealing a gap between joined-component parts. Especially, the present invention relates to a sealing structure for sealing an elongated gap formed between a vehicle body and an exterior component part for vehicles, wherein a sealing member of elastic material is mounted on the component part and pressed against a surface of the vehicle body to form a waterproof structure etc. between the vehicle body and the component part.

BACKGROUND OF THE INVENTION

As illustrated in FIGS. 1A and 1B, a side sill garnish 4 may be mounted on a side sill 3 of a body 2 of a vehicle 1 for the purposes of protecting the vehicle body 2 from small stones hit against the vehicle body 2, improving aerodynamic properties of the vehicle body 2, and so on. The side sill garnish 4 is a molded article of synthetic resin. The side sill garnish 4 is attached to the outer surface of the vehicle body 2 so as to cover the side sill 3. A sealing member 5 made of rubber is arranged between the outer surface of the vehicle body 2 and the side sill garnish 4 so that the sealing member 5 could prevent rainwater, dust etc. from entering into the space between the outer surface of the vehicle body 2 and the inner surface of the side sill garnish 4.

The conventional sealing member 5 as illustrated in FIGS. 2A and 2B comprises a lip portion 6, a connecting portion 7 and a fixing portion 8, which are molded into one piece made of elastic materials such as synthetic rubber. The lip portion 6 is configured to extend from the upper surface of the side sill garnish 4 to the side sill 3 so as to close the elongated gap between the side sill garnish 4 and the side sill 3. The connecting portion 7 lies between the end face 9 of the side sill garnish 4 and the surface 10 of the side sill 3, so that the connecting portion 7 could prevent the side sill garnish 4 from bumping against the side sill 3 and also absorb the vibrations of the side sill garnish 4. The connecting portion 7 extends from the back side of the lip portion 6, wherein the junction of the portions 7 and 6 is approximately in the central area of the lip portion 6 as shown in FIGS. 2A and 2B. The fixing portion 8 extends from the lower end of the connecting portion 7 and further extends along the back side 11 of the side sill garnish 4. The fixing portion 8 is fixed to the back side 11 of the side sill garnish 4 by means of a double-sided adhesive tape 12.

The sealing member 5 of FIGS. 2A and 2B might possibly impose restrictions on modification of the design of the vehicle 1, because the lip portion 6 is exposed to the outside of the side sill 3 and the side sill garnish 4. In order to liberate the vehicle design from such restrictions, the sealing structure illustrated in FIGS. 2C and 2D has been proposed. The sealing structure of FIGS. 2C and 2D is characterized in that a stepped section 13 is formed in the lower half of the end face 9 of the side sill garnish 4 and a lip portion 15 of a sealing member 14 is received in the stepped section 13. In addition to the lip portion 15, the sealing member 14 has a connecting portion 16 and a fixing portion 17. The lip portion 15 is continuous with the connecting portion 16 and the connecting portion 16 is also continuous with the fixing portion 17. The fixing portion 17 extends along the back side 11 of the side sill garnish 4 and is fixed to the back side 11 of the side sill garnish 4 by means of a double-sided adhesive tape 12. The sealing member 14 shown in FIGS. 2C and 2D is integrally molded into one piece made of elastic materials such as synthetic rubber, in the same manner as the sealing member 5 of FIGS. 2A and 2B.

The sealing structure illustrated in FIGS. 2C and 2D has the advantage of being hard to see the sealing member 14 from the side of the vehicle 1, because the lip portion 15 of the sealing member 14 runs below the upper wall 18 having the thickness that is properly determined to obtain the above advantage. When the side sill garnish 4 shown in FIGS. 2C and 2D is mounted on the side sill 3 of the vehicle body 2, however, the lip portion 15 is possibly caught inside the side sill garnish 4 and become deformed irregularly due to the elasticity of the sealing member 14. It might be impossible to obtain desired functions and effects of the sealing member 14 from the lip portion 15 that has been irregularly deformed between the side sill 3 and the side sill garnish 4.

Japanese Patent Public Disclosure No. 2006-044292 (Japanese Patent Application No. 2004-223977) discloses a mounting structure of a protector for an automobile body, which is characterized by a small projection 24 that is hard to be irregularly deformed rather than an elongated lip 44 when being pressed against the surface of a vehicle body (refer to FIGS. 2-6 in the drawings). According to the mounting structure, however, the elastic deformation of the small projection 24 is inevitably limited to a narrow band of stroke against a body panel 1, because the small projection 24 is formed on the back of a concave portion 21 and a salient 13 of an exterior component 10 is fit into the concave portion 21, so that the small projection 24 is always arranged in the narrow gap between the body panel 1 and the salient 13 that is projecting toward the body panel 1. In addition, the small projection 24 is stiff as mentioned above. Therefore, the small projection 24 of the conventional mounting structure might not be able to conform closely to the body panel 1 over the entire length of the elongated gap between the body panel 1 and the exterior component 10, because the gap varies the form and size with location. If the small projection 24 mounted on the exterior component 10 might not be tight on the body panel 1 over the entire length of the elongated gap, the conventional mounting structure does not serve as a waterproof structure.

SUMMARY OF THE INVENTION

One object of the present invention is to provide a sealing structure for sealing a gap between joined-component parts, wherein a sealing member of elastic materials closely conform to the shape of the component part over the entire length of the gap even though the form or size of the gap varies by location, and thereby a tighter seal is created over the entire length of the gap.

Another object of the present invention is to provide a sealing structure for sealing a gap between joined-component parts, wherein a sealing member of elastic materials is prevented from deforming to irregular shapes when the component parts are joined to each other, and thereby a tighter seal is created over the entire length of the gap.

A further object of the present invention is to provide a sealing structure for sealing a gap between joined-component parts, wherein a sealing member of elastic material is concealed behind the joined-component parts, and thereby a desirable appearance of the sealing structure is presented.

A further object of the present invention is to provide a sealing structure for sealing an elongated gap between a body panel of a vehicle and an exterior component part for vehicles such as a side sill garnish.

The sealing structure according to the present invention comprises a sealing member of elastic materials that is attached to one component part and pressed against the other component part to seal the gap between the component parts joined to each other, wherein one component part is provided with an upper wall and a lower wall that protrude from the region opposed to the other component part, the upper and lower walls extend along the seal area between the sealing member and the other component part, a channel is formed between the upper and lower walls so as to extend along the seal area, the sealing member comprises a lip portion, a connecting portion and a fixing portion. The lip portion is tabular in shape and continuously extends from the inside of the channel to the surface of the other component part. The connecting portion branches from the intermediate region of the underside of the lip portion and then extends along the end face of the lower wall with saving a side clearance between the connecting portion and the other component part. The connecting portion continues into the fixing portion that extends along the backside of the lower wall and is fixed to the backside of the lower wall. The lip portion is elastically compressed by the component parts to create a seal area between the component parts joined to each other.

According to the sealing structure of the present invention, one component part is provided with a channel into which a tabular lip portion of a sealing member is inserted. The lip portion continuously extends from the inside of the channel to the surface of the other component part. Therefore, the deformability of the lip portion can be changed to a desired extent in the direction of the other component part by altering the depth of the channel accordingly. Thereby, the sealing member of elastic materials can closely conform to the component parts over the entire length of an elongated gap even though the form or size of the gap varies by location. As a result, a tighter seal can be created over the entire length of the elongated gap.

According to the sealing structure of the present invention, a lip portion of a sealing member is inserted into a channel between an upper wall and a lower wall of one component part and fixed to the component part through a connecting portion and a fixing portion of the sealing member. Since the connecting portion branches from the intermediate region of the underside of the lip portion and then extends along the end face of the lower wall, an upwardly or downwardly bendable area of the lip portion is restricted to the area that extends from the front edge of the lip portion to the proximal end of the connecting portion. The lip portion is considered to be substantially non-bendable in other areas. Therefore, the sealing member of elastic materials is prevented from deforming to irregular shapes when the component parts are joined to each other. As a result, a tighter seal can be created over the entire length of the gap.

According to the sealing structure of the present invention, the upper wall of one component part extends along the lip portion of the sealing member that is inserted into the channel formed along the underside of the upper wall. The upper wall is protruding toward the surface of the other component part to overhang the lip portion of the sealing member. Since the overhang dimension of the upper wall changes according as the depth of the channel changes, the overhang of the upper wall can be dimensioned to make it difficult to see the lip portion from the outside of the component parts. Thereby, it is possible to design the sealing structure with a good appearance in according with the present invention.

DESCRIPTION OF FIGURES

In the following, preferred embodiments of the invention will be described in detail with reference to the attached figures in the drawings, in which:

FIG. 1A shows a perspective view of a vehicle indicating a side sill of the vehicle body;

FIG. 1B shows a perspective view of a side sill garnish and a sealing member of elastic materials attached to the side sill garnish;

Other and further features of the present invention will be revealed from the following description in this specification.

DETAILED DESCRIPTION OF THE INVENTION

FIGS. 3, 4A, 4B and 5 illustrate one example of the sealing structure according to the present invention, which is embodied as a sealing structure for sealing a gap between a side sill of a vehicle body and a side sill garnish mounted on the side sill of a vehicle body.

Figure 2A:
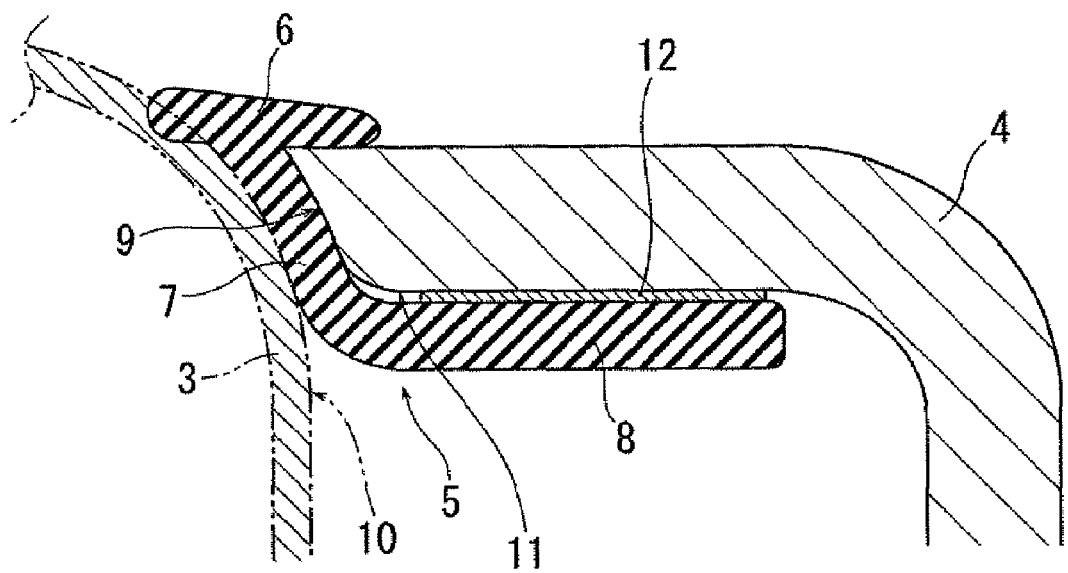
FIG. 2A shows a sectional view of a conventional sealing member that is attached to the side sill garnish but not deformed yet by the side sill of the vehicle body.
Figure 2B:
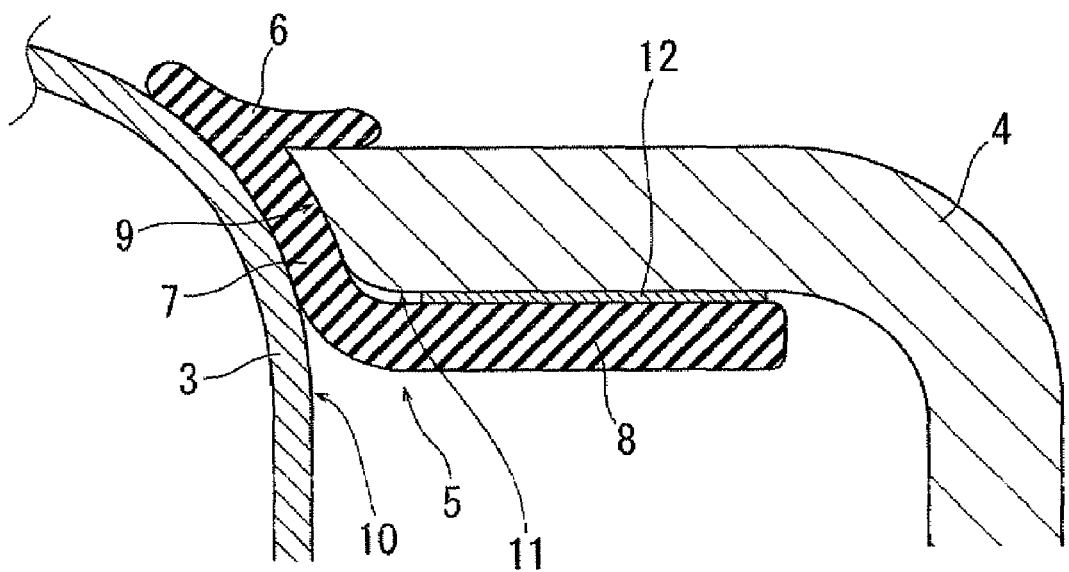
FIG. 2B shows a sectional view of a conventional structure for sealing the gap between the side sill garnish and the side sill of the vehicle body, in which the sealing member of FIG. 2A is deformed to seal the gap between the side sill garnish and the side sill.
Figure 2C:
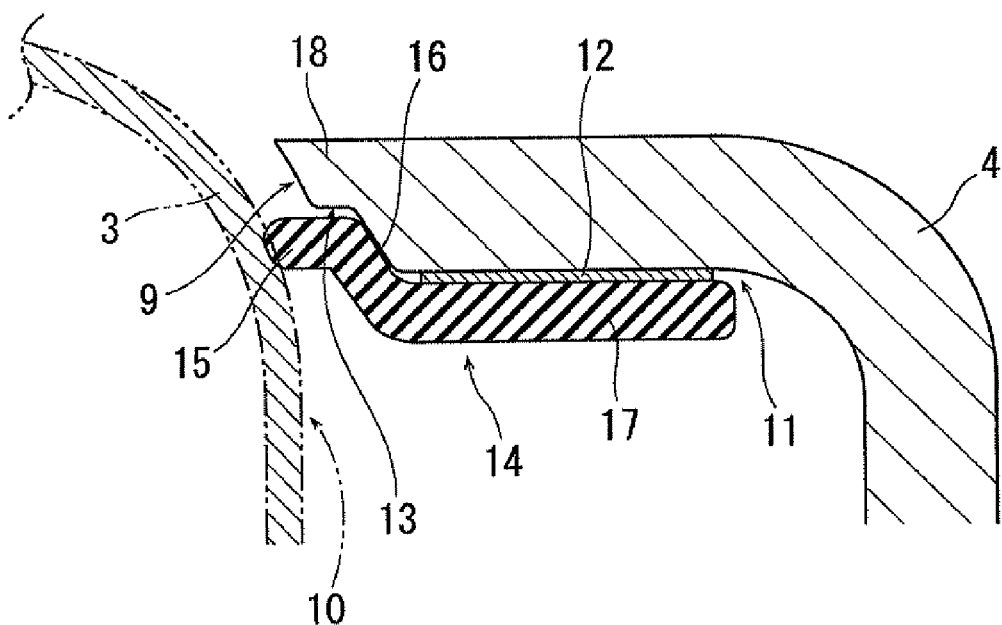
FIG. 2C shows a sectional view of another sealing member of a conventional type, which is attached to the side sill garnish but not deformed yet by the side sill of the vehicle body.
Figure 2D:
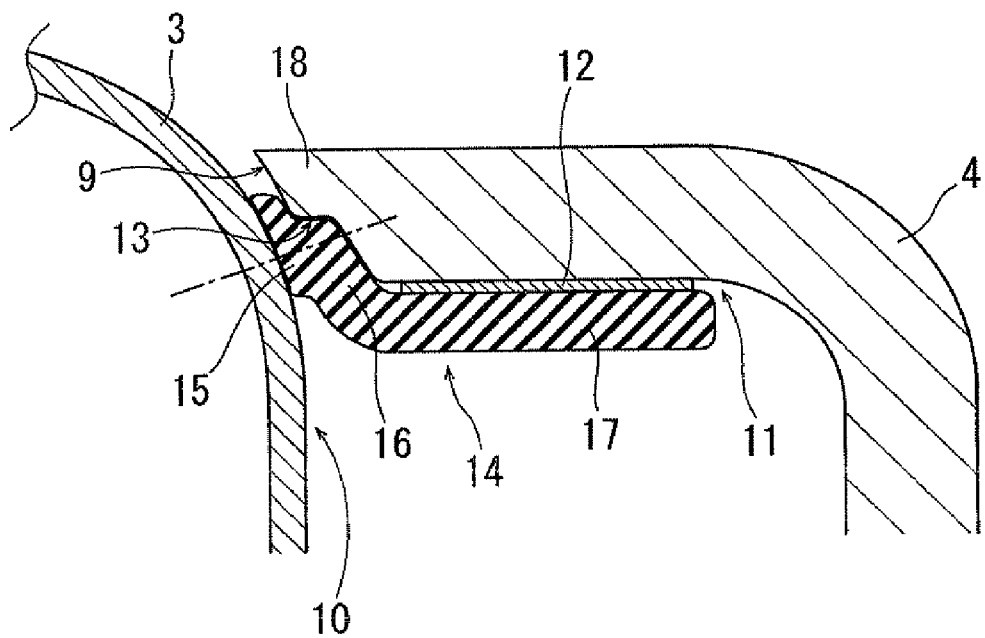
FIG. 2D shows a sectional view of a conventional structure for sealing the gap between the side sill garnish and the side sill of the vehicle body, in which the sealing member of FIG. 2C is deformed to seal the gap between the side sill garnish and the side sill.
Figure 3:
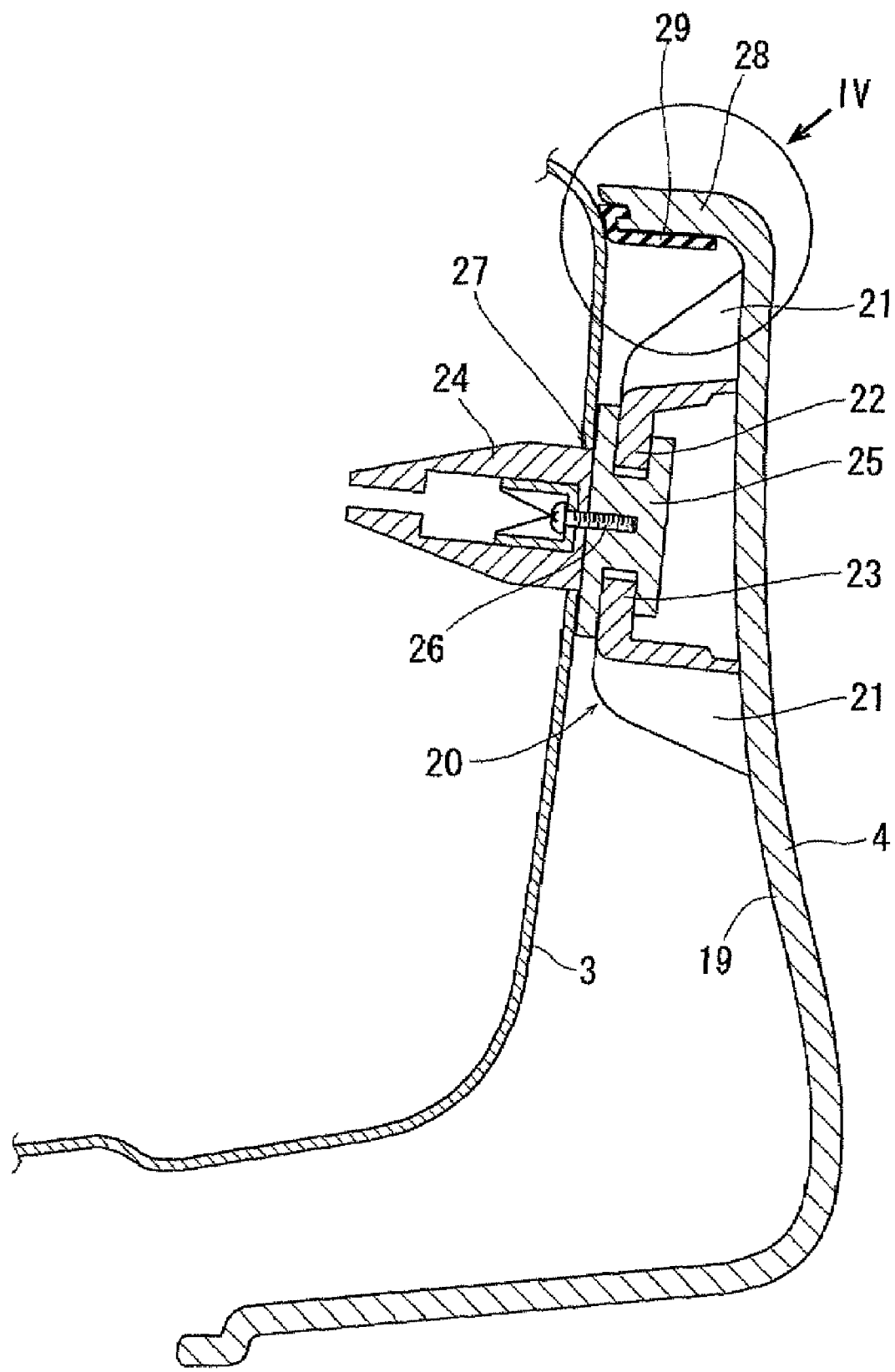
FIG. 3 shows a sectional view of a sealing structure according to the present invention, which is embodied as a sealing structure for sealing a gap between the side sill garnish and the side sill of the vehicle body in FIGS. 1A and 1B.

As illustrated in FIG. 3, a side sill garnish 4 is a synthetic resin molded automotive component with a generally J-shaped cross section. The side sill garnish 4 has a plurality of brackets 20 that are molded to protrude from the inner surface 19 of the side sill garnish 4. The brackets 20 are aligned in the longitudinal direction of the side sill garnish 4 and arranged at predetermined intervals. The brackets 20 are provided with reinforcement ribs 21, respectively. The brackets 20 include a pair of end portions 22, 23 that are opposed to each other. A spring hook 24 is fixed to a base member 25 by means of a screw 26. The base member 25 is pressed into engagement with the opposed end portions 22, 23 of the brackets 20 in the longitudinal direction of the side sill garnish 4. In addition, the side sill 3 of a vehicle body is perforated with a plurality of hook engagement holes 27 into which the spring hooks 24 are respectively fitted. In order to mount the side sill garnish 4 on the side sill 3 of a vehicle body, the spring hooks 24 attached to the side sill garnish 4 are simultaneously fitted into the corresponding hook engagement holes 27 of the side sill 3. Thereby, the side sill garnish 4 is mounted on the side sill 3 of a vehicle body as illustrated in FIG. 3. In order to dismount the side sill garnish 4 from the side shill 3 of a vehicle body, the side sill garnish 4 is displaced in the longitudinal direction thereof in relation to the side sill 3 to remove the opposed end portions 22, 23 of the brackets 20 from the base members 25 on the side sill 3. When the side sill garnish 4 is removed from the side sill 3, the base members 25 and the spring hooks 24 remain on the side sill 3 of a vehicle body.

Figure 4A:
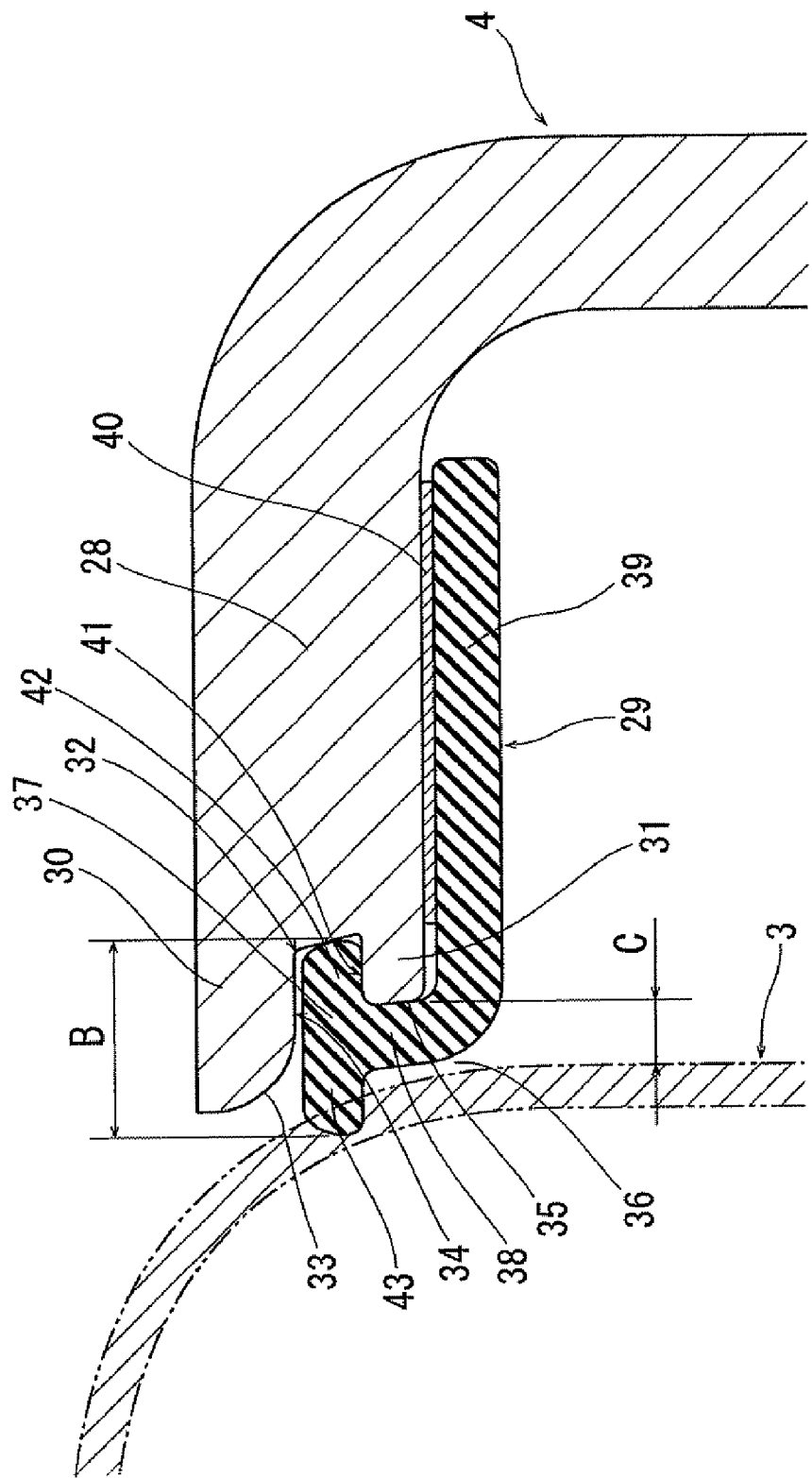
FIG. 4A shows an enlarged view of a circled portion indicated by arrow IV in FIG. 3, in which the sealing member is attached to the side sill garnish but not deformed yet by the side sill of the vehicle body.
Figure 4B:
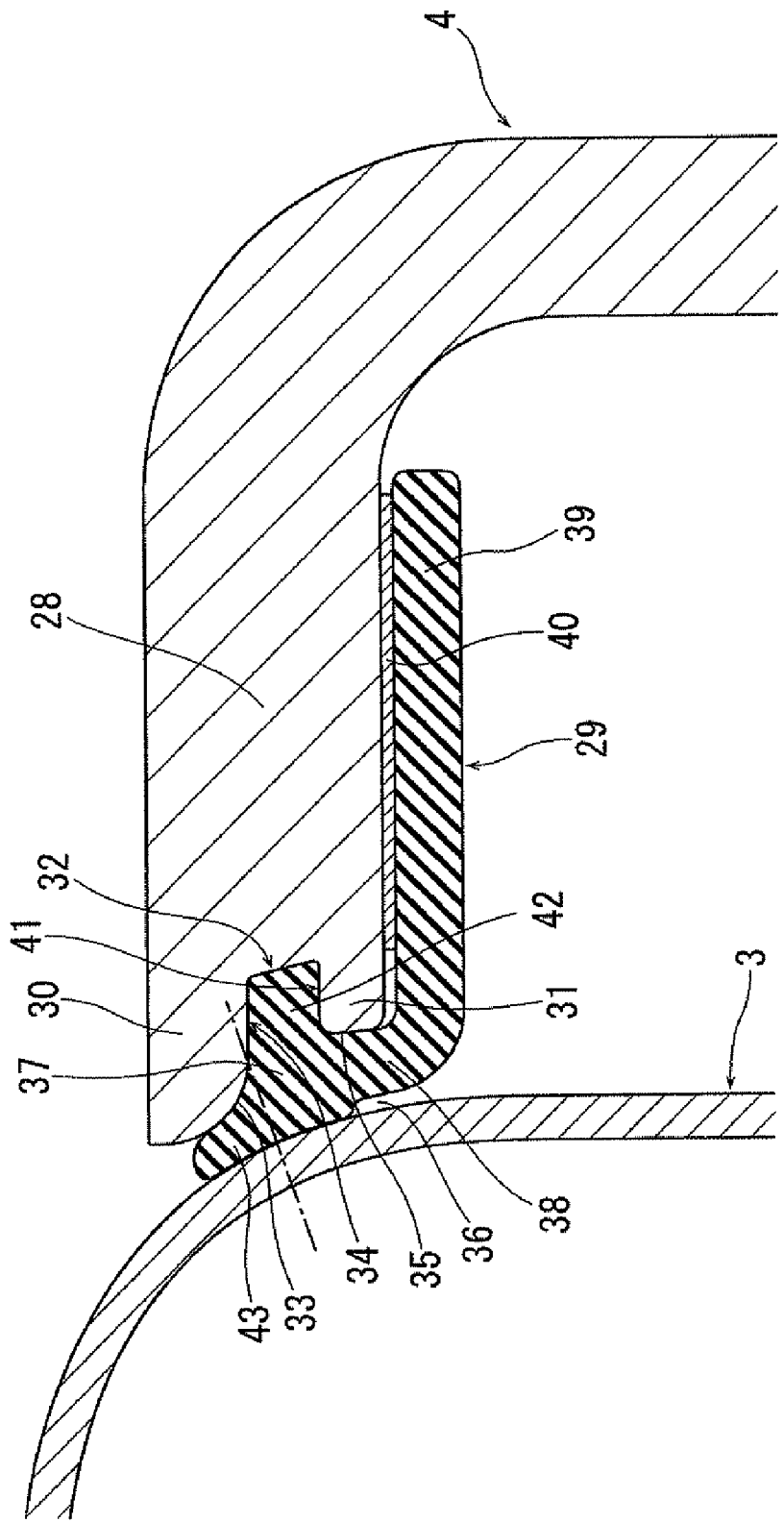
FIG. 4B shows an enlarged view of a circled portion indicated by arrow IV in FIG. 3, in which the sealing member is deformed to seal the gap between the side sill garnish and the side sill of the vehicle body.

A sealing member 29 of elastic materials is mounted along the top end portion 28 of the side sill garnish 4. As illustrated in FIGS. 3, 4A and 4B, the sealing member 29 creates a watertight seal between the side shill 3 of a vehicle body and the top end portion 28 of the side sill garnish 4 mounted on the side sill 3.

Figure 5:
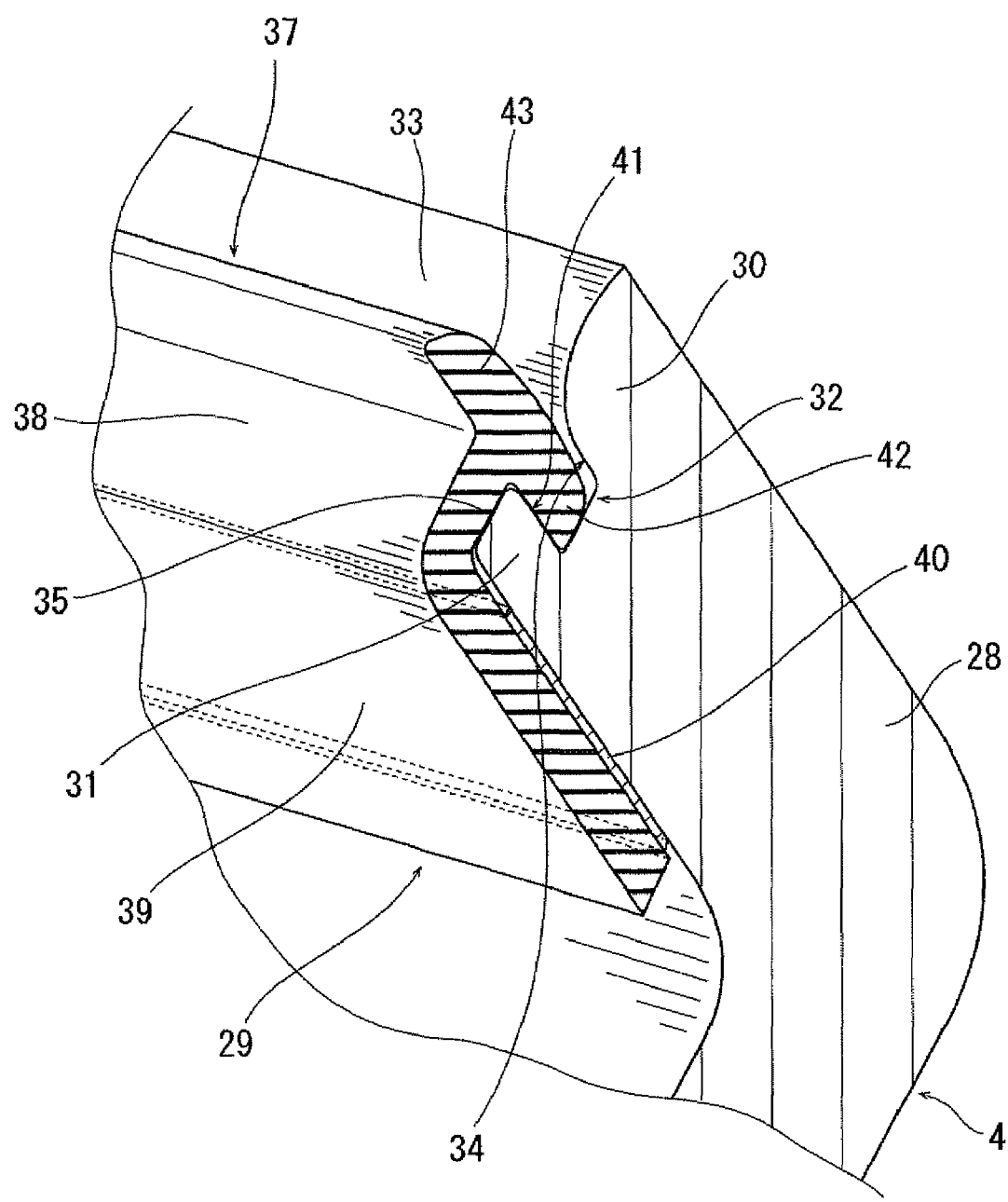
FIG. 5 shows a perspective view of the sealing member attached to the side sill garnish of FIGS. 3, 4A and 4B.

As illustrated in FIGS. 4A, 4B and 5, an upper wall 30 and a lower wall 31 are formed along the top end portion 28 of the side sill garnish 4. The upper wall 30 and the lower wall 31 are formed to project toward the surface of the side sill 3 and a channel 32 is configured between the upper wall 30 and the lower wall 31. The upper wall 30, the lower wall 31 and the channel 32 extend in the longitudinal direction of the side sill garnish 4, whereas the channel 32 has an opening facing toward the surface of the side sill 3. Since the upper wall 30 considerably protrudes from the top end portion 28 toward the side sill 3 to overhang the sealing member 29, it is hard to see the sealing member 29 from the outside of the side sill garnish 4. The end face 33 of the upper wall 30 is a convexly curved surface that smoothly connects to the upper side 34 of the channel 32. The lower wall 31 protrudes smaller than the upper wall 30 in the direction of the side sill 3 so that a side clearance 36 can be created between the surface of the side sill 3 and the sealing member 29 extending along the end face 35 of the lower wall 31.

The sealing member 29 of elastic materials comprises a lip portion 37, a connecting portion 38 and a fixing portion 39. The lip portion 37 is generally tabular in shape. The connecting portion 38 branches from the intermediate region of the underside of the lip portion 37 and then extends downwardly. The connecting portion 37 continues into the fixing portion 39 so that the fixing portion 39 extends from the lower end of the connecting portion 38. The fixing portion 39 further extends along the backside of the top end portion 28 of the side sill garnish 4. The sealing member 29 is attached to the side sill garnish 4 by the steps of inserting the lip portion 37 into the channel 32 and securing the fixing portion 39 to the underside of the top end portion 28 of the side sill garnish 4 by means of a double-sided adhesive tape 40. Simultaneously, the connecting portion 38 of the sealing member 29 is arranged to extend along the end face 35 of the lower wall 31.

The tabular lip portion 37 comprises a pinched portion 42 and a deformable portion 43. The pinched portion 42 is arranged to be compressed by the upper side 34 and the lower side 41 of the channel 32. The deformable portion 43 is arranged to be compressed against the surface of the side sill 3. When the side sill garnish 4 is mounted on the side sill 3, the deformable portion 43 is pressed against the surface of the side sill 3 to create a seal area between the deformable portion 43 and the side sill 3. The dimension B of the lip portion 37, which is measured in the direction of the side sill 3, should be determined to prevent the lip portion from falling into the inside of the side sill garnish 4, provided that the deformation of the lip portion 37 can be limited within the permissible measure of deformation of an individual product, when the side sill garnish 4 deforms to separate from the side sill 3 and enlarge the dimension C of the gap between the surface of the side sill 3 and the end face 35 of the lower wall 31. As a result that the sealing member 29 of elastic material does not fall into the inside of the side sill garnish 4, the sealing performance established between the lip portion 37 and the side sill 3 of a vehicle body is not decreased. In addition, the elastic deformation range of the lip portion 37 increases in the direction of the side sill 3 as the dimension B of the lip portion 37 increases. Therefore, the lip portion 37 can conform to the surface profile of the side sill 3 so as not to decrease the waterproof performance established between the side sill 3 and the side sill garnish 4, when the dimension B of the lip portion 37 is determined largely enough for fitting the lip portion 37 to a variety of the gap dimensions between the side sill 3 and the side sill garnish 4.

While the side sill garnish 4 is mounted on the side sill 3, a side clearance 36 is retained between the surface of the side sill 3 and the connecting portion 38 of the sealing member 29, as illustrated in FIGS. 4A and 4B. Due to the side clearance 36, the connecting portion 38 remains away from the surface of the side sill 3 so that the compression of the deformable portion 43 of the lip portion 37 is not hampered. In other words, the deformable portion 43 of the sealing member 29 can be compressed intendedly under the condition that the deformable portion 43 remains in contact with the surface of the side sill 3. Thereby, the sealing member 29 can maintain a sealing area of excellent performance on the surface of the side sill 3, and the sealing member 29 can also fit the side sill garnish 4 to the surface of the side sill 3. In addition, the pinched portion 42 of the sealing member 29 may be designed to expand in the directions of the upper side 34 and the lower side 41 of the channel 32 when the sealing member 29 is compressed between the side sill 3 and the side sill garnish 4. According to the sealing member 29 having such a pinched portion 42 as mentioned above, it is possible to diminish the amount of deformation of the deformable portion 43 when the side sill garnish 4 moves up and down in relation to the side sill 3.

In addition, the lip portion 37 inserted into the channel 32 is supported by the connecting portion 38, which branches from the intermediate region of the underside of the lip portion 37 and then extends along the end face 35 of the lower wall 31. Accordingly, the sealing member 29 is allowed to deform only in the region from the tip of the lip portion 37 to the connecting portion 38 when the tip of the lip portion 37 is pressed against the surface of the side sill 3, as illustrated in FIGS. 4A and 4B. In other words, the sealing structure of the present invention can avoid enwinding the sealing member 29 upwardly or downwardly and also avoid causing irregular deformation of the sealing member 29 Therefore, the performance of the sealing member 29 is not hampered by the deformation of the sealing member 29.

INDUSTRIAL APPLICABILITY

In the aforementioned embodiments of the present invention, the sealing structure according to the present invention is explained with reference to a sealing structure applied to a side sill of a vehicle and a side sill garnish attached thereto. However, it is noted that the present invention is not limited to a sealing structure for sealing a gap between a side sill of a vehicle body and a side sill garnish attached thereto. The present invention can be applied to a variety of sealing structures between two components or articles, wherein a sealing member of elastic materials is compressed against component parts or articles to seal the gap therebetween. The scopes of the present invention are defined by the scopes of the appended claims.

What is claimed is:

1. A sealing structure sealing a gap between first and second components, comprising:
   a sealing member of an elastic material attached to the first component and pressed against the second component to create a sealing area between the first and second components, wherein
      the first component has an upper wall, a lower wall, and a channel extending along the sealing area,
      the upper and lower walls project from the first component toward the second component so that the channel is located between the upper and lower walls,
      the sealing member of elastic material has a tabular lip portion, a connecting portion, and a fixing portion, wherein
         the lip portion tabularly extends from inside of the channel to a surface of the second component and is compressed between the first and second components to create the sealing area,
         the connecting portion branches from an intermediate region of an under side of the lip portion and extends along an end face of the lower wall, except for a side clearance between the connecting portion and the second component, and
         the connecting portion continues into the fixing portion that extends along a back side of the lower wall; and
   a fixing device for securing the fixing portion to the back side of the lower wall.

2. The sealing structure as claimed in claim 1, wherein the tabular lip portion comprises a proximal edge elastically pressed against a bottom portion of the channel and a front edge elastically pressed against a surface of the second component.

3. The sealing structure as claimed in claim 1, wherein
   the tabular lip portion comprises a deformable portion elastically pressed against the surface of the second component and a pinched portion disposed between upper and lower sides of the channel,
   said deformable portion is deformed alongside the surface of the second component and an end face of the upper wall of the first component, as the lip portion is compressed between the first and second components, and
   the pinched portion is elastically pressed against a bottom portion, the upper side and the lower side of the channel, as the lip portion is compressed between the first and second components.

4. The sealing structure as claimed in claim 3, wherein the end face of said upper wall of the first component comprises a convexly curved surface that smoothly connects to the upper side of the channel.

5. The sealing structure as claimed in claim 1, wherein the upper wall of the first component overhangs the lip portion of the sealing member so that the lip portion is nearly invisible from outside of the first and second components.

6. The sealing structure as claimed in claim 1, wherein the fixing device is a double-sided adhesive tape disposed between the fixing portion of the sealing member and the back side of the lower wall of the first component.

7. The sealing structure as claimed in claim 1, wherein the surface of the second component is a generally convexly or concavely curved surface, to which the sealing member elastically conforms to define the sealing area.

8. The sealing structure as claimed in claim 1, wherein the first component is an exterior component part for a vehicle, and the second component is a part of a vehicle body.

9. The sealing structure as claimed in claim 2, wherein
   the tabular lip portion comprises a deformable portion elastically pressed against the surface of the second component and a pinched portion disposed between upper and lower sides of the channel, said deformable portion is deformed alongside the surface of the second component and an end face of the upper wall of the first component, as the lip portion is compressed between the first and second components, and
   the pinched portion is elastically pressed against a bottom portion, the upper side and the lower side of the channel, as the lip portion is compressed between the first and second components.

10. The sealing structure as claimed in claim 9, wherein the end face of said upper wall of the first component comprises a convexly curved surface that smoothly connects to the upper side of the channel.

11. The sealing structure as claimed in claim 2, wherein the upper wall of the first component overhangs the lip portion of the sealing member so that the lip portion is nearly invisible from outside of the first and second components.

12. The sealing structure as claimed in claim 2, wherein the fixing device is a double-sided adhesive tape disposed between the fixing portion of the sealing member and the back side of the lower wall of the first component.

13. The sealing structure as claimed in claim 2, wherein the surface of the second component is a generally convexly or concavely curved surface, to which the sealing member elastically conforms to define the sealing area.

14. The sealing structure as claimed in claim 2, wherein the first component is an exterior component part for a vehicle, and the second component is a part of a vehicle body.

* * * * *